(12) United States Patent
Ahn et al.

(10) Patent No.: US 9,160,493 B2
(45) Date of Patent: Oct. 13, 2015

(54) METHOD AND APPARATUS FOR TRANSMITTING ACK/NACK

(75) Inventors: Jun Kui Ahn, Anyang-si (KR); Min Gyu Kim, Anyang-si (KR); Suck Chel Yang, Anyang-si (KR); Dong Youn Seo, Anyang-si (KR); Jung Hoon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 777 days.

(21) Appl. No.: 13/255,822

(22) PCT Filed: Mar. 22, 2010

(86) PCT No.: PCT/KR2010/001742
§ 371 (c)(1),
(2), (4) Date: Nov. 14, 2011

(87) PCT Pub. No.: WO2010/110561
PCT Pub. Date: Sep. 30, 2010

(65) Prior Publication Data
US 2012/0057487 A1   Mar. 8, 2012

Related U.S. Application Data

(60) Provisional application No. 61/162,665, filed on Mar. 23, 2009, provisional application No. 61/218,983, filed on Jun. 21, 2009, provisional application No. 61/242,367, filed on Sep. 14, 2009, provisional application No. 61/242,365, filed on Sep. 14, 2009,
(Continued)

(30) Foreign Application Priority Data

Mar. 17, 2010   (KR) .................. 10-2010-0023874

(51) Int. Cl.
*H04L 12/26* (2006.01)
*H04L 1/16* (2006.01)
*H04L 1/18* (2006.01)

(52) U.S. Cl.
CPC ............ *H04L 1/1614* (2013.01); *H04L 1/1812* (2013.01); *H04L 1/1854* (2013.01)

(58) Field of Classification Search
CPC ..... H04L 5/001; H04L 5/0055; H04L 1/1614; H04L 1/1854
USPC ........................................................ 370/252
See application file for complete search history.

(56) References Cited

U.S. PATENT DOCUMENTS

2008/0049692 A1   2/2008 Bachu et al.
2008/0095109 A1*  4/2008 Malladi et al. ............... 370/330
(Continued)

FOREIGN PATENT DOCUMENTS

WO   WO 2008/097965 A2   8/2008
WO   WO 2008/156414 A2   12/2008

*Primary Examiner* — Shripal Khajuria
*Assistant Examiner* — Faisal Choudhury
(74) *Attorney, Agent, or Firm* — Birch, Stewart, Kolasch & Birch, LLP

(57) ABSTRACT

The present invention is directed to a wireless communication system. Particularly, the present invention is directed to a method and an apparatus of transmitting an ACK/NACK (acknowledgement/negative ACK) signal by a user equipment in a wireless communication system, which includes receiving a plurality of data units from a base station, bundling ACK/NACK results for a plurality of the data units per time or frequency interval to obtain at least one bundled ACK/NACK result, performing ACK/NACK multiplexing over the at least one ACK/NACK result to determine an uplink resource for ACK/NACK transmission and a bit sequence, and transmitting the bit sequence to the base station via the uplink resource for the ACK/NACK transmission.

6 Claims, 18 Drawing Sheets

Related U.S. Application Data provisional application No. 61/243,141, filed on Sep. 16, 2009, provisional application No. 61/243,142, filed on Sep. 16, 2009.

(56) References Cited

U.S. PATENT DOCUMENTS

| | | | |
|---|---|---|---|
| 2010/0172428 A1* | 7/2010 | Pani et al. | 375/262 |
| 2010/0195587 A1* | 8/2010 | Ratasuk et al. | 370/329 |
| 2010/0210256 A1* | 8/2010 | Shen et al. | 455/422.1 |
| 2010/0271970 A1* | 10/2010 | Pan et al. | 370/252 |
| 2010/0272048 A1* | 10/2010 | Pan et al. | 370/329 |
| 2010/0303035 A1* | 12/2010 | Gao et al. | 370/329 |
| 2011/0116530 A1* | 5/2011 | Sambhwani | 375/145 |
| 2011/0141878 A1* | 6/2011 | Che et al. | 370/216 |
| 2012/0093097 A1* | 4/2012 | Che et al. | 370/329 |
| 2012/0106569 A1* | 5/2012 | Che et al. | 370/437 |

\* cited by examiner

Single component carrier (e.g. LTE system)

PUCCH format 1a and 1b structure (normal CP case)

○ ACK/NACK bundling

◯ ACK/NACK multiplexing

METHOD AND APPARATUS FOR TRANSMITTING ACK/NACK

CROSS REFERENCE TO RELATED APPLICATIONS

This application is the National Phase of PCT/KR2010/001742 filed on Mar. 22, 2010, which claims priority under 35 U.S.C. 119(e) to U.S. Provisional Application Nos. 61/162,665, 61/218,983, 61/242,367, 61/242,365, 61/243,141, and 61/243,142 filed on Mar. 23, 2009, Jun. 21, 2009, Sep. 14, 2009, Sep. 14, 2009, Sep. 16, 2009, and Sep. 16, 2009 respectively, and under 35 U.S.C. 119(a) to Patent Application No. 10-2010-0023874 filed in Republic of Korea, on Mar. 17, 2010. The entire contents of all of the above applications are hereby incorporated by reference into the present application.

TECHNICAL FIELD

The present invention relates to a wireless communication system, and more particularly, to a method and apparatus of transmitting ACK/NACK signal.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DISCLOSURE OF INVENTION

Technical Problem

Accordingly, the present invention is directed to a method and apparatus of transmitting signal, which substantially obviates one or more problems due to limitations and disadvantages of the related art.

An object of the present invention is to provide a method and apparatus of transmitting ACK/NACK (Acknowledgement/Negative-ACK) signal in a wireless communication system.

An object of the present invention is to provide a method and apparatus of multiplexing ACK/NACK signals in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

Accordingly, the present invention is directed to a method and apparatus for transmitting ACK/NACK that substantially obviates one or more of the problems due to limitations and disadvantages of the related art.

An object of the present invention is to provide a method and apparatus for transmitting ACK/NACK.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting an ACK/NACK (acknowledgement/negative ACK) signal by a user equipment in a wireless communication system is provided, wherein the method comprises receiving a plurality of data units from a base station, bundling ACK/NACK results for a plurality of the data units per a time and/or frequency interval to obtain at least one bundled ACK/NACK result, performing ACK/NACK multiplexing over the at least one ACK/NACK result to determine an uplink resource for ACK/NACK transmission and a bit sequence, and transmitting the bit sequence to the base station via the uplink resource for the ACK/NACK transmission.

To further achieve these and other advantages and in accordance with the purpose of the present invention, a user equipment includes an RF (radio frequency) unit configured to transceive a radio signal with a base station, a memory configured to store information transceived with the base station and parameters required for an operation of the user equipment, and a processor connected to the RF unit and the memory, the processor configured to control the RF unit and the memory. And, the processor is configured to process a method which comprises receiving a plurality of data units from the base station, bundling ACK/NACK results for a plurality of the data units per a time and/or frequency interval to obtain at least one bundled ACK/NACK result, performing ACK/NACK multiplexing over the at least one ACK/NACK result to determine an uplink resource for ACK/NACK transmission and a bit sequence, and transmitting the bit sequence to the base station via the uplink resource for the ACK/NACK transmission.

Preferably, a plurality of the data units are received via a plurality of downlink component carriers, a plurality of downlink subframes or both of a plurality of the downlink component carriers and a plurality of the downlink subframes.

Preferably, the ACK/NACK results for a plurality of the data units are bundled per downlink component carrier or downlink component carrier group.

Preferably, the ACK/NACK results for a plurality of the data units are bundled per at least one subframe.

Preferably, the uplink resource for the ACK/NACK transmission includes a PUCCH (physical uplink control channel) resource.

Preferably, the uplink resource for the ACK/NACK transmission is determined in a slot unit.

Preferably, the step of transmitting the bit sequence via the uplink resource for the ACK/NACK transmission is performed via a specific uplink component carrier only.

It is to be understood that both the foregoing general description and the following detailed description are exemplary and explanatory and are intended to provide further explanation of the invention as claimed.

Advantageous Effects of Invention

According to embodiments of the present invention, ACK/NACK signals can be efficiently transmitted in a wireless communication system. In particular, ACK/NACK signals can be efficiently multiplexed in a wireless communication system.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

Figure 1:
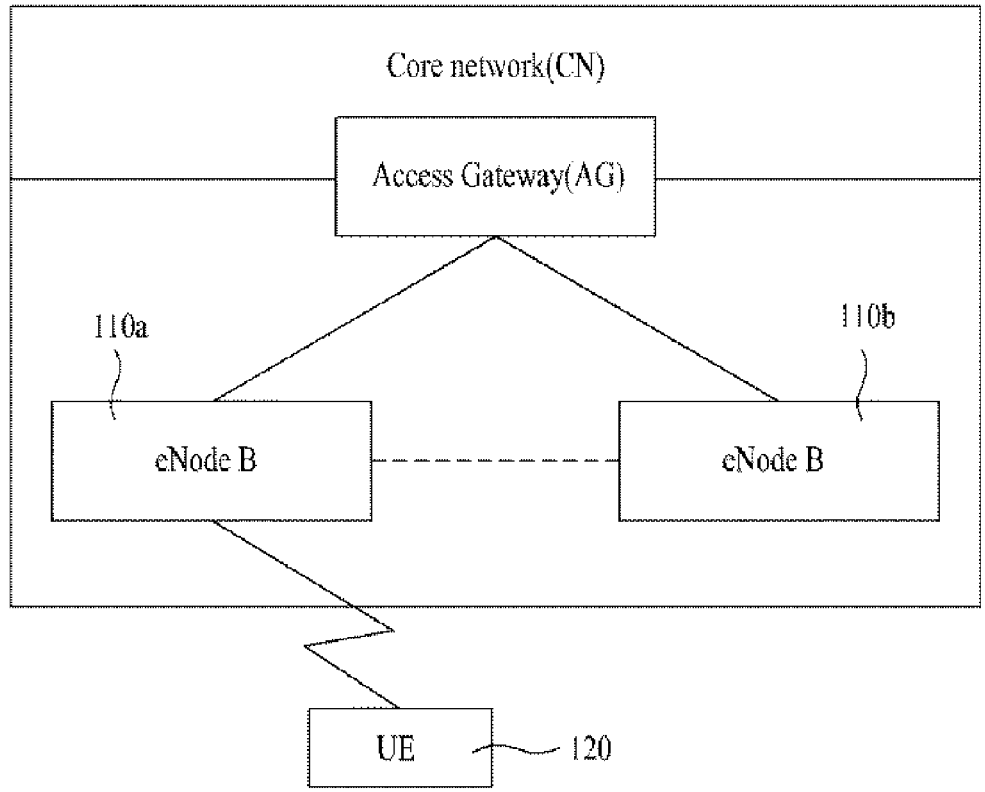
FIG. 1 is a diagram for a network structure of an E-UMTS (evolved universal mobile telecommunications system)

FIG. 1 is a diagram illustrating a network structure of an Evolved Universal Mobile Telecommunications System (E-UMTS). The E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to a corresponding user equipment to notify the corresponding user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, HARQ. A Core Network (CN) may include the AG and a network node for user registration of the UE. The AG manages mobility of a UE on a Tracking Area (TA) basis, wherein one TA includes a plurality of cells.

Figure 2:
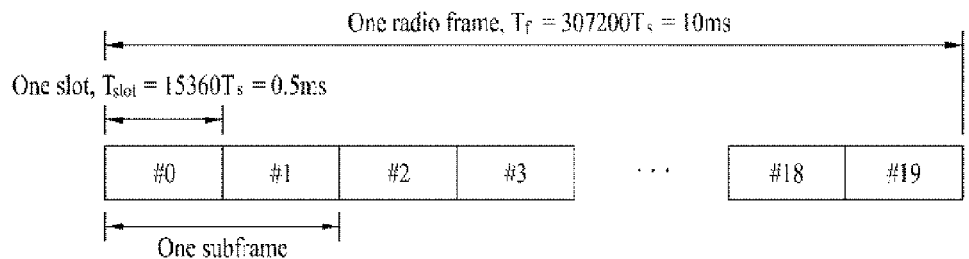
FIG. 2 is an exemplary diagram for a structure of a radio frame used in LTE.

FIG. 2 is a diagram illustrating a structure of a radio frame used in the LTE system.

Referring to FIG. 2, the radio frame has a length of 10 ms ($327200*T_s$) and includes 10 subframes of an equal size. Each sub frame has a length of 1 ms and includes two slots. Each slot has a length of 0.5 ms ($15360*T_s$). In this case, $T_s$ represents a sampling time, and is expressed by $T_s=1/(15 kHz*2048)=3.2552\times10^{-8}$ (about 33 ns). The slot includes a plurality of OFDMA (or SC-FDMA) symbols in a time domain, and includes a plurality of resource blocks (RBs) in a frequency domain. In the LTE system, one resource block includes twelve (12) subcarriers * seven (or six) OFDMA (or SC-FDMA) symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDMA (or SC-FDMA) symbols included in the slot.

Figure 3:
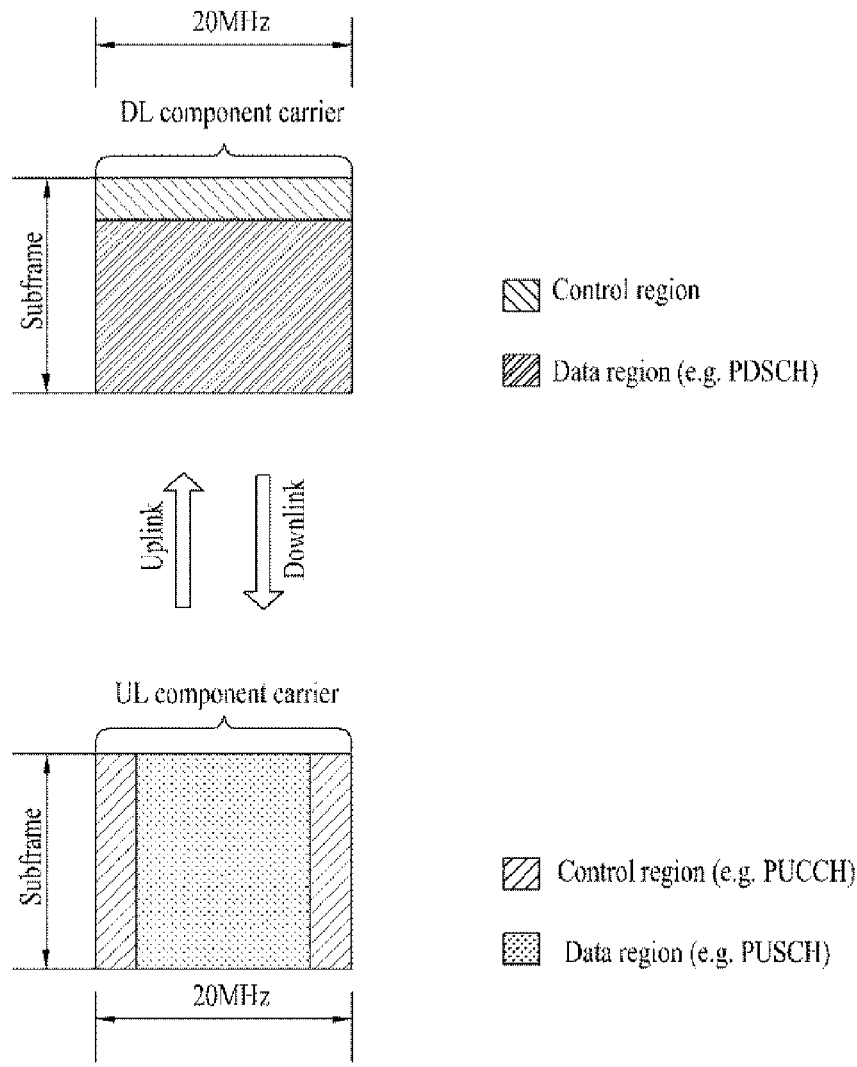
FIG. 3 is an exemplary diagram for a structure of a DL subframe used in LTE.

FIG. 3 is a diagram illustrating an example of communication performed under a single component carrier. FIG. 3 corresponds to a communication example of the LTE system. In the FDD mode, data transmission and reception is performed through one downlink band and one uplink band corresponding to the downlink band. In more detail, in the FDD mode, the radio frame structure of FIG. 2 is used for downlink transmission or uplink transmission only. On the other hand, in the TDD mode, the same frequency band is divided into a downlink interval and an uplink interval corresponding to the downlink interval in the time domain. In more detail, in the TDD mode, the radio frame structure of FIG. 2 is divided for downlink transmission and uplink transmission corresponding to the downlink transmission.

In downlink, control region starts from the first OFDMA symbol of a subframe and includes one or more OFDMA symbol. The size of the control region may be configured independently per subframe. The control region is used to transmit L1/L2 (layer 1/layer 2) control information. Control channel allocated in the control region includes PCFICH (Physical Control Format Indicator CHannel), PHICH (Physical Hybrid-ARQ Indicator CHannel), PDCCH (Physical Downlink Control CHannel).

The PDCCH is allocated in first n OFDMA symbols of a subframe. n is an integer that is the same or more that 1 and is indicated by the PCFICH. The PDCCH is consisting of one or more CCEs. Each CCE includes 9 REGs, where each REG is consisting of four neighbouring resource elements in a state of excluding reference signals. The resource element is a minimum resource unit which is defined as 1 surcarrier by 1 symbol. The PDCCH informed each UE or a group of UEs of information associated with resource allocation of transport channels PCH (Paging channel) and DL-SCH (Downlink-shared channel), uplink scheduling grant, HARQ information, etc. The PCH (Paging channel) and the DL-SCH (Downlink-shared channel) are transmitted through a PDSCH (Physical Downlink Shared Channel). Information indicating to which UE (one or a plurality of UEs) PDSCH data is transmitted and how the UE receive and decode PDSCH data is transmitted in a state of being included in the PDCCH. For example, it is assumed that a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by "B" and "C" in the PDCCH information.

When a data unit (e.g., a packet) is transmitted in a wireless communication system, an Rx (receiving) node (e.g., a receiving end, a receiver, etc.) should inform a Tx (transmitting) node (e.g., a transmitting end, a transmitter, etc.) of a success/failure of a data unit reception. If decoding the data unit is successful, the receiver transmits ACK (acknowledgement) to enable the transmitter to transmit a new data unit. On the contrary, if the decoding the data unit is not successful, the receiver transmits NACK (negative ACK) to enable the transmitter to retransmit the corresponding data unit. This operation is called ARQ (automatic repeat request). Meanwhile, HARQ (hybrid ARQ) is a scheme generated from combining ARQ and channel coding together. The HARQ is able to lower an error rate by combining a retransmitted data unit with a previously received data unit. In the HARQ, ACK/NACK (A/N) is transmitted by physical channel signaling. HARQ implementing methods are mainly classified into a chase combining (CC) scheme and an incremental redundancy (IR) scheme.

Figure 4:
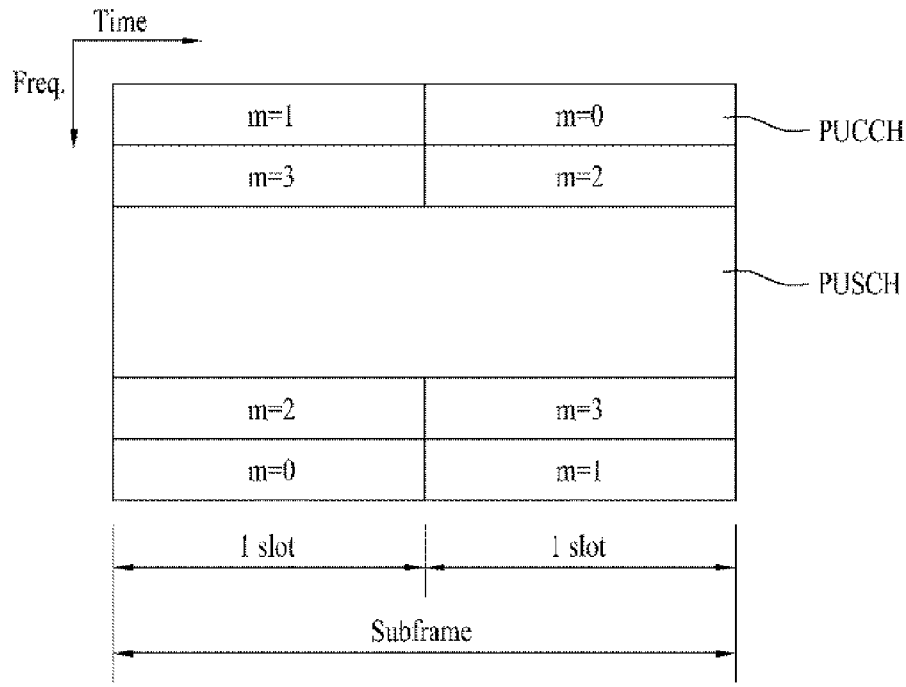
FIG. 4 is an exemplary diagram for a structure of a UL subframe used in LTE.

FIG. 4 is a diagram illustrating a structure of an uplink subframe used in an LTE system.

Referring to FIG. 4, the uplink subframe includes a plurality of slots (for example, two slots). The slot can include a different number of SC-FDMA symbols depending on a CP length. For example, in case of a normal CP, the slot includes seven SC-FDMA symbols. The uplink subframe is divided into a data region and a control region. The data region includes a physical uplink shared channel (PUSCH), and is used to transmit a data signal such as voice. The control region includes a physical uplink control channel (PUCCH), and is used to transmit control information. The PUCCH includes a pair of resource blocks (RBs) (for example, m=0, 1,2,3) located at both ends of the data region on the frequency axis, and is hopped using the slot as a boundary. The control information includes HARQ ACK/NACK, channel quality indicator (CQI), precoding matrix index (PMI), and rank index (RI).

Figure 5:
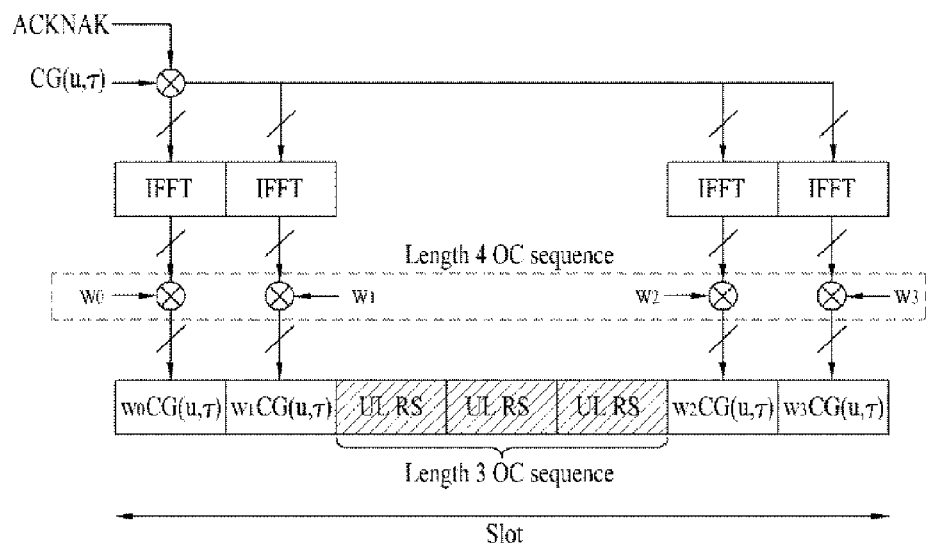
FIG. 5 is an exemplary diagram for a structure of a UL control channel used in LTE.

FIG. 5 is a diagram illustrating a structure of a physical uplink control channel (PUCCH) for transmitting ACK/NACK.

Referring to FIG. 5, in case of a normal cyclic prefix (CP), a reference signal (UL RS) is carried in three continuous symbols located in the center of the slot, and control information (i.e., ACK/NACK signals) is carried in the other four symbols. In case of an extended CP, the slot includes six symbols, wherein a reference signal is carried in the third and fourth symbols. ACK/NACK signals from a plurality of user equipments are multiplexed with one PUCCH resource by using a CDM mode. The CDM mode is implemented using cyclic shift (CS) of frequency spreading and/or (quasi) orthogonal spreading codes for time spreading. For example, ACK/NACK are identified using different cyclic shifts (CS) of computer generated constant amplitude zero auto correlation (CG-CAZAC) sequence (frequency spreading) and/or different walsh/DFT orthogonal codes (time spreading). w0, w1, w2, w3 multiplied after IFFT obtain the same result even though they are multiplied before IFFT. In the LTE system, PUCCH resources for transmitting ACK/NACK are expressed by combination of frequency-time resources (for example, resource block), cyclic shift of sequences for frequency spreading, and (quasi)orthogonal codes for time spreading. Each PUCCH resource is indicated using a PUCCH (resource) index.

Figure 6:
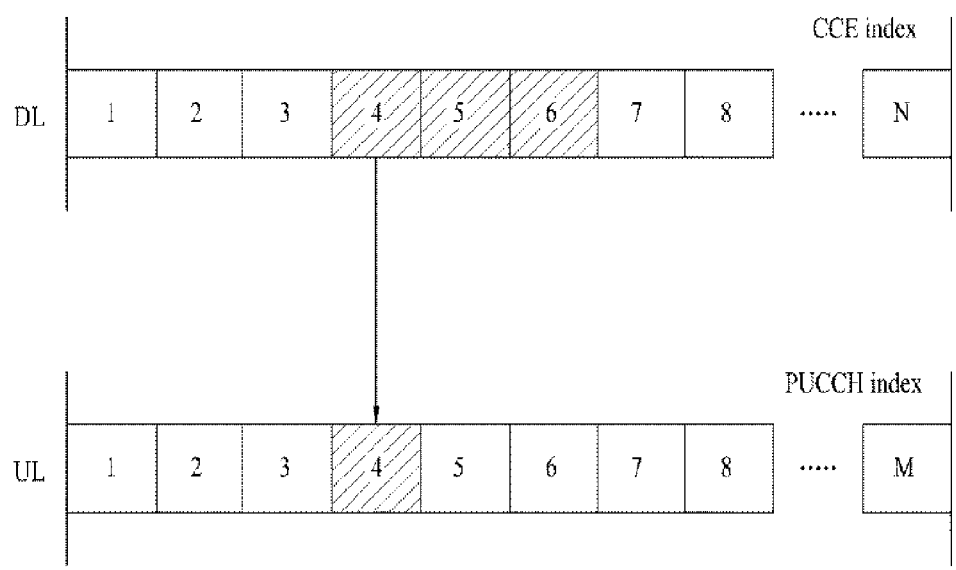
FIG. 6 is an exemplary diagram for correspondent relation between PUCCH and PDCCH for ACK/NACK transmission.

FIG. 6 is a diagram illustrating an example of determining PUCCH resources for ACK/NACK. In the LTE system, PUCCH resources for ACK/NACK are not previously allocated to each user equipment but shared by a plurality of user equipments within a cell per timing point. In more detail, the PUCCH resources used for ACK/NACK transmission correspond to PDCCH carrying scheduling information of corresponding downlink data. In each downlink subframe, an entire region where PDCCH(s) is transmitted includes a plurality of control channel elements (CCEs), and the PDCCH transmitted to the user equipment includes one or more CCEs. The user equipment transmits ACK/NACK through a PUCCH resource corresponding to a specific CCE (for example, first CCE) among CCEs constituting PDCCH received therein.

Referring to FIG. 6, each square block in a downlink (DL) represents a CCE, and each square block in an uplink (UL) represents a PUCCH resource. Each PUCCH index corresponds to a PUCCH resource for ACK/NACK. It is assumed that information regarding PDSCH information is transferred through a PDCCH that includes CCEs Nos. 4 to 6 as illustrated in FIG. 6. In this case, the user equipment transmits ACK/NACK through PUCCH No. 4 corresponding to CCE No. 4 which is the first CCE of the PDCCH. FIG. 6 illustrates that maximum M number of PUCCHs exist in the UL CC when maximum N number of CCEs exist in the DL CC. Although N may be equal to M (N=M), M may be different from N, and mapping between CCEs and PUCCHs may be overlapped.

In more detail, in the LTE system, PUCCH resource index is defined as follows.

$$n^{(1)}_{PUCCH} = n_{CCE} + N^{(1)}_{PUCCH} \quad \text{[Equation 1]}$$

In this case, $n^{(1)}_{PUCCH}$ represents a PUCCH resource index for transmitting ACK/NACK, $N^{(1)}_{PUCCH}$ represents a signaling value transferred from an upper layer, and $n_{CCE}$ represents the smallest value of CCE indexes used for PDCCH transmission.

As shown in the equation 1, the PUCCH index for ACK/NACK transmission is decided according to the first CCE used for PDCCH transmission. And then, the RB (Resource Block) index, orthogonal cover index, and cyclic shift value of the PUCCH resource for the actual PUCCH transmission are decided according to the PUCCH index. eNB should reserve PUCCH resources that are equal to the number of CCEs for PDCCH transmission. In case that the number of CCEs for PDCCH transmission is more than 1, the remaining PUCCH indices which are mapped to remaining CCE indices except for the first CCE are not used for actual PUCCH transmission.

Figure 7:
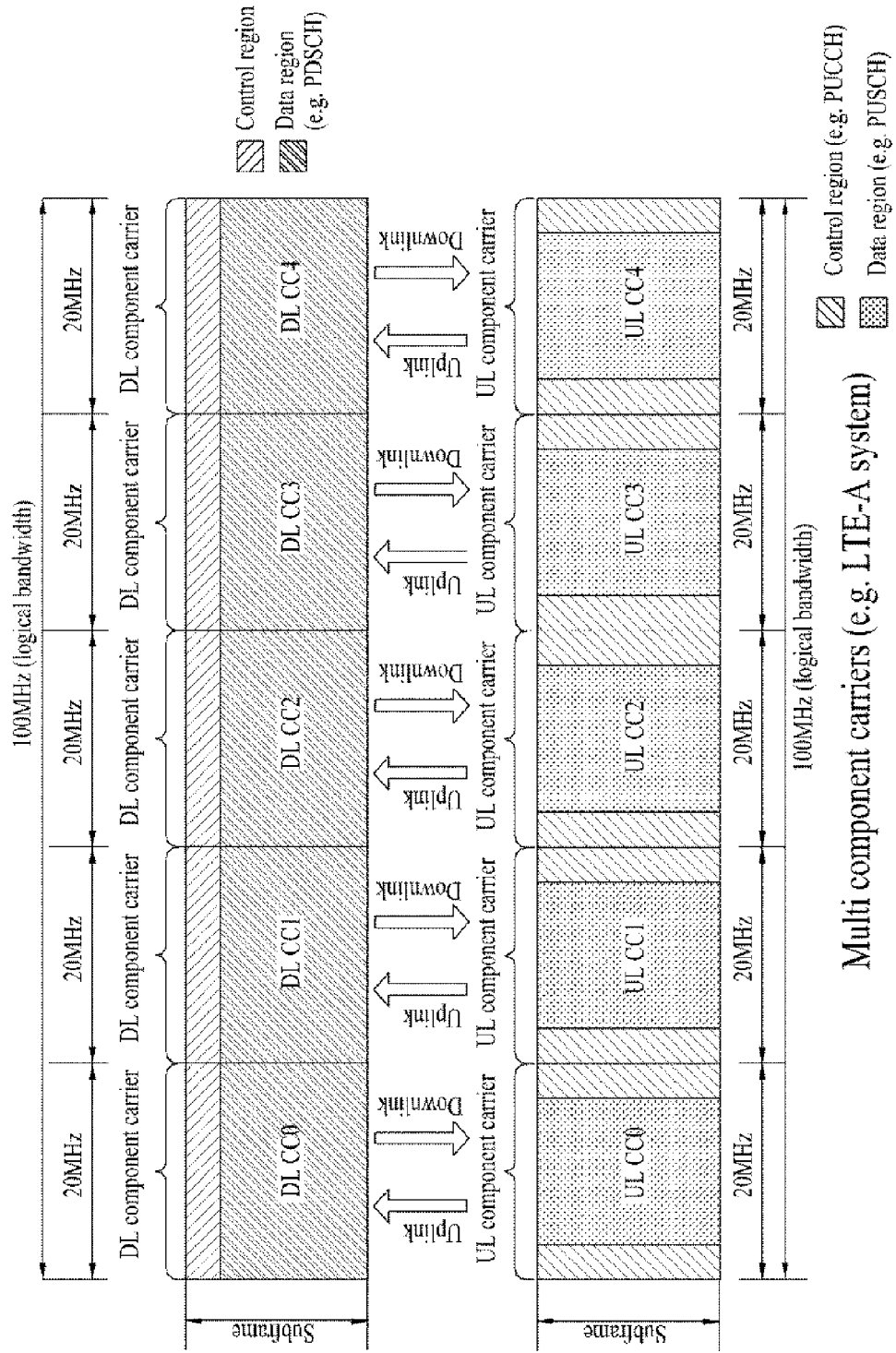
FIG. 7 is a diagram for an example of performing communication in multi-component carrier environment.

FIG. 7 is a diagram illustrating an example of communication performed under multiple component carriers. FIG. 7 corresponds to a communication example of the LTE-A system. The LTE-A system uses carrier aggregation or bandwidth aggregation where a plurality of uplink/downlink frequency blocks are collected to use broader frequency bandwidths, thereby using greater uplink/downlink bandwidths. Each frequency block is transmitted using a component carrier (CC). The CC may mean a frequency block for carrier aggregation or a center carrier of a frequency block depending on the context, wherein the frequency block and the center carrier are used together.

Referring to FIG. 7, five component carriers (CCs) of 20 MHz are collected in the uplink/downlink to support a bandwidth of 100 MHz. The respective CCs may be contiguous or non-contiguous each other in the frequency domain.

FIG. 7 illustrates that a bandwidth of each UL CC is the same as and symmetrical to that of each DL CC. However, the bandwidths of the respective component carriers may be defined independently. For example, the bandwidths of the UL CCs may be configured as 5 MHz (UL CC0)+20 MHz (UL CC1)+20 MHz (UL CC2)+20 MHz (UL CC3)+5 MHz (UL CC4). Also, asymmetrical carrier aggregation where the number of uplink component carriers is different from the number of downlink component carriers may be configured. The asymmetrical carrier aggregation may occur due to a limit of available frequency bandwidth, or may be configured artificially by network establishment. For example, even though N number of CCs are configured in the entire system band, a frequency band that can be used by a user equipment can be limited to M(<N) number of CCs. Various parameters of carrier aggregation can be set in accordance with a cell-specific scheme, a UE group-specific scheme, or a UE-specific scheme.

Although an uplink signal and a downlink signal are illustrated to be transmitted through CCs mapped with each other one to one in FIG. 7, CC through which a signal is actually transmitted may be varied depending on network establishment or signal type. For example, CC through which scheduling command is transmitted may be different from CC through which data are transmitted in accordance with scheduling command. Also, control information associated with DL CC can be transmitted through a specific UL CC regardless of mapping between CCs. Similarly downlink control information can be transmitted through a specific DL CC.

A Tx node can transmit multiple data units to a Rx node within a given amount of physical resources and the Rx node transmits the corresponding multiple ACK/NACKs within a given amount of physical resources. Physical resource includes frequency, time, space, code or any combination thereof. As a baseline, we assume the Rx node transmits ACK/NACK(s) corresponding to each data unit through a unit ACK/NACK resource. For convenience, the unit ACK/NACK resource is simply referred as ACK/NACK unit. For example, the ACK/NACK unit includes a PUCCH resource for ACK/NACK transmission. For any reason (e.g., asymmetric carrier aggregation, TDD mode, relay backhaul link, etc.), the number of data units to be transmitted through one uplink subframe may become large. In this case, the RX node may have to transmit ACK/NACKs through too many number of ACK/NACK units, which makes ACK/NACK transmission/reception complex and may require large amount of total ACK/NACK transmission power. To prevent transmission of too many number of ACK/NACK units and reduce the total ACK/NACK transmission power, following methods can be considered.

ACK/NACK Bundling

With ACK/NACK bundling, ACK/NACK responses for multiple data units are combined by logical-AND operation. For example, if the Rx node decodes all the data units successfully, Rx node transmits ACK using one ACK/NACK unit. Otherwise, if the Rx node fails in decoding (or detecting) any of the data units transmitted the Rx node may either transmits NACK using one ACK/NACK unit or transmits nothing for ACK/NACK.

ACK/NACK Multiplexing

With ACK/NACK multiplexing, contents of the ACK/NACK responses for multiple data units are identified by the combination of the ACK/NACK unit used in actual ACK/NACK transmission and the contents of the transmitted ACK/NACK. For example, if we assume one ACK/NACK unit carries two bits and two data units can be transmitted in maximum (here we assume HARQ operation for each data unit can be managed by single ACK/NACK bit), The ACK/NACK result can be identified at the Tx node as in the following table 1.

TABLE 1

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

In table 1, HARQ-ACK(i) indicates the ACK/NACK result for the data unit i. DTX indicates that there is no data unit transmitted for corresponding HARQ-ACK(i) or the RX node doesn't detect the existence of the data unit corresponding to HARQ-ACK(i). NACK/DTX indicates that NACK and DTX are coupled each other. That is, NACK/DTX indicates only that ACK/NACK result is either NACK or DTX. $n^{(1)}_{PUCCH,X}$ indicates the ACK/NACK unit which should be used in actual ACK/NACK transmission, where there are two ACK/NACK units, $n^{(1)}_{PUCCH,0}$ and $n^{(1)}_{PUCCH,1}$ in maximum. b(0),b(1) indicates two bits carried by the selected ACK/NACK unit. For example, if the Rx node receives and decodes two data units successfully, the Rx node should transmit two bits, (1, 1), using ACK/NACK unit $n^{(1)}_{PUCCH,1}$. For another example, if the Tx node transmits two data units but the RX node fails in decoding (or misses) the first data unit (corresponding to HARQ-ACK(0)) and decodes the second data unit (corresponding to HARQ-ACK(1)) successfully, the RX node should transmit (1, 0) using $n^{(1)}_{PUCCH,1}$. By linking the actual ACK/NACK contents with the combination of ACK/NACK unit selection and the actual bit contents in the transmitted ACK/NACK unit in this way, ACK/NACK transmission using single ACK/NACK unit for multiple data units is possible. The example above referring to the table 1 can be extended to the ACK/NACK transmission for more than 2 data units in natural way.

When the maximum number of data units which can be transmitted within a given physical resource is large, applying ACK/NACK bundling or ACK/NACK multiplexing over all the data units may lead to too much complexity and/or complex error cases which should be handled. Therefore, limitations or combinations of ACK/NACK transmission schemes are desirable when the maximum number of data units is large. In the following description, an ACK/NACK transmitting scheme according to an embodiment of the present invention is explained with reference to the accompanying drawings.

In this disclosure, an ACK/NACK result (or response) indicates ACK or NACK for each data unit. In addition, the ACK/NACK result can indicate DTX or NACK/DTX. The ACK/NACK result can include a single bit or a plurality of bits based on a presence or non-presence of SDMA (spatial division multiple access) transmission. Meanwhile, in this specification, an ACK/NACK signal indicates a physical signal carried on a physical channel. Unless mentioned otherwise, an ACK/NACK result, an ACK/NACK response or an ACK/NACK signal can be simply called ACK/NACK and can be mixed with each other in use according to a context.

For clarity and convenience of the following description, an embodiment of the present invention is explained mainly focused on a method of multiplexing a plurality of ACK/NACKs in case that a user equipment receives a plurality of data units from a base station (or a relay). Besides, a data unit decoding process, an ACK/NACK generating/transmitting process, an initial transmission/retransmission process according to ACK/NACK and the like can be performed by general methods.

First Embodiment

ACK/NACK Bundling Per Data Unit
Group+Multiple ACK/NACK Unit Transmission

According to a first embodiment, a plurality of (potential) data units are divided into N groups (where N≥1). A plurality of the data units can be grouped per time interval (e.g., at least one subframe), frequency interval (e.g., at least one DL CC) or time/frequency interval. A plurality of ACK/NACK results for data units belonging to each of the groups are converted to one bundled ACK/NACK result (e.g., 1-bit information) by ACK/NACK bundling. Subsequently, a user equipment transmits each bundled ACK/NACK result to a base station using one corresponding ACK/NACK unit. In particular, if there are M*N (potential) data units, the user equipment is able to transmit N bundled ACK/NACKs using N ACK/NACK units. The data unit group is defined to explain a bundle of data units for convenience and may not be explicitly defined in the process for describing transmitting/receiving end operations. The number (M) of data units included in a data unit group can be independently determined for each data unit group. In this case, the number M is an integer equal to or greater than 1 and can be determined equal to or independent from each data unit group. If the M is set to 1, ACK/NACK bundling is not applied to the corresponding data unit group.

A user equipment is able to use one of a plurality of ACK/NACK units linked to a data unit (e.g., PDSCH) received for each data unit group or a control signal (e.g., PDCCH) accompanied by a received data unit. In particular, the ACK/NACK unit carrying each bundled ACK/NACK result can be previously defined to be linked to a specific PDSCH (or PDCCH) in a corresponding data unit group. The specific PDSCH (or PDCCH) may be the one located at a first or last position/order in time, frequency or time/frequency interval for configuring the data unit group. For instance, it is able to determine the position/order of the PDSCH (or PDCCH) using a subframe index, a DL CC index or a CCE index (e.g., if DL CC index is identical). Meanwhile, limitation can be put in a manner that the specific PDSCH (or PDCCH) should be associated with a UL CC specified for the use of carrying UL control information (e.g., ACK/NACK). Moreover, the ACK/NACK unit carrying each of the bundled ACK/NACK results can be signaled via PDSCH or PDCCH indicating the PDSCH. And, signaling information can include at least one of information indicating that the corresponding PDSCH (or PDCCH) is for PUCCH allocation, a UL CC index, and PUCCH index change information.

Figure 8:
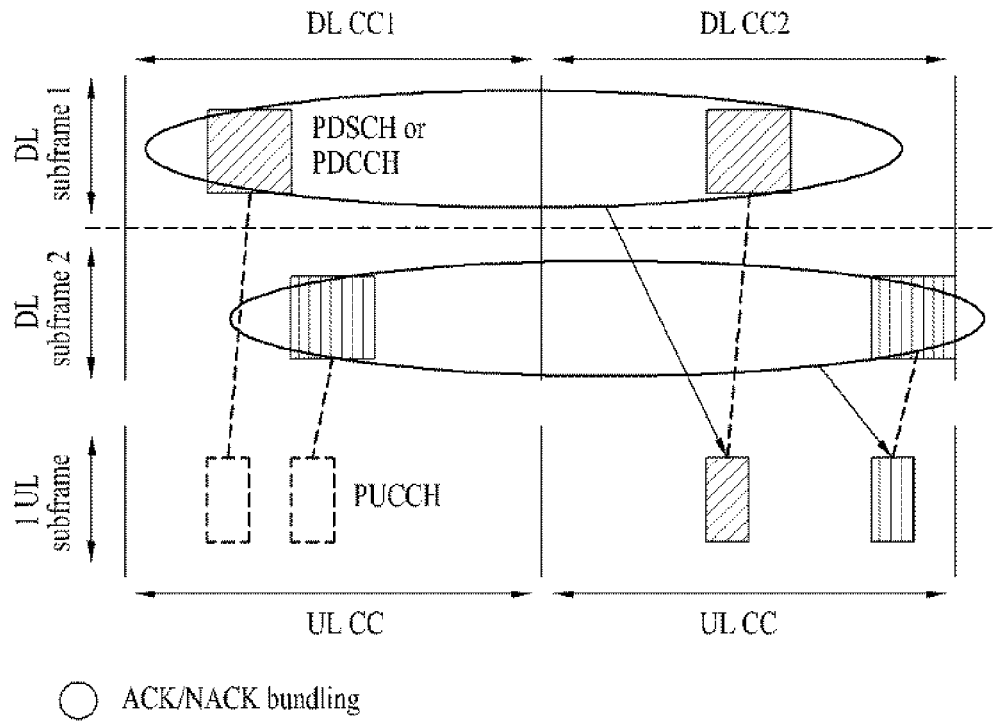
FIG. 8 is an exemplary diagram of ACK/NACK transmission according to one embodiment of the present invention.

FIG. 8 is an exemplary diagram of ACK/NACK transmission according to a first embodiment of the present invention. In case of TDD system supporting DL CC aggregation, a base station is able to transmit a plurality of PDSCHs to a user equipment via a plurality of DL CCs and a plurality of DL subframes. The user equipment has to transmit a plurality of ACK/NACKs via PUCCH or PUSCH within a single UL subframe. FIG. 8 shows an example of transmitting ACK/NACK signal via single UL subframe in case of receiving PDSCH via 2 DL subframes and 2 DL CCs. The example shown in FIG. 8 identically applies to an FDD system supporting DL CC aggregation or a TDD system having no DL CC aggregation.

Referring to FIG. 8, 4 PDSCHs are received via 2 DL CCs in 2 DL subframes. In this case, a user equipment reserves one or more PUCCH resources for ACK/NACK transmission regarding the 4 PDSCHs. PUCCH resource for ACK/NACK transmission may be reserved to be exclusive or to be overlapped between PUCCHs. PUCCH resource for ACK/NACK transmission is identified by use of a predetermined rule or a semi-static configured resource linkage rule (e.g. using RRC signaling). For example, PUCCH resource for ACK/NACK transmission may be dynamically linked to PDSCH carrying downlink data unit (or PDCCH which schedules the PDSCH) (FIG. 8). Specifically, PUCCH resource for ACK/NACK transmission is identified from the first CCE constituting PDCCH by using the equation 1. For another example, a user equipment may use PUCCH resource which is linked per DL CC (group) and/or DL subframe (group) (not shown). To this end, one or more PUCCH resources for ACK/NACK transmission may be allocated in a semi-static manner. According to cases, information of DL CC (group) (e.g., index regarding DL CC (group) or offset from a reference DL CC (group)) and/or information of DL subframe (group) (e.g., index regarding DL subframe (group) or offset from a reference DL subframe (group)) may be directly linked to an allocated PUCCH resources, or may be used as a modification information (e.g., offset) which is further applied to a resource linkage rule such as the equation 1. Meanwhile, PUCCH resource for ACK/NACK transmission may be indicated directly or indirectly using L1/L2 control information (e.g., PDCCH which is corresponding to PDSCH). Moreover, the L1/L2 control information (e.g., PDCCH which is corresponding to PDSCH) may be used to further limit/modify a resource linkage rule such as the equation 1.

A user equipment then generates a bundled ACK/NACK for 2 PDSCHs received via each of the DL subframes and then transmits 2 bundled ACK/NACKs for the 2 DL subframes using the PUCCH linked to a specific PDSCH (e.g., a first PDSCH or a last PDSCH) or PDCCH in each of the DL subframes. A plurality of the bundled ACK/NACKs can be transmitted on a single PUCCH which is modulated to carry a plurality of bits. The PUCCH carrying the bundled ACK/NACK relevant to each data unit group can be transmitted via a specific UL CC (e.g., an anchor or primary UL CC) or different UL CCs.

Second Embodiment

ACK/NACK Multiplexing Per Data Unit Group+Multiple ACK/NACK Unit Transmission

According to a second embodiment, a plurality of (potential) data units are divided into N groups (where N≥1). A plurality of the data units can be grouped per time interval (e.g., at least one subframe), frequency interval (e.g., at least one DL CC) or time/frequency interval. A plurality of ACK/NACK results for the data units belonging to each of the groups are transmitted to a base station using a single ACK/NACK unit selected based on ACK/NACK multiplexing. In particular, if there are M*N (potential) data units, a user equipment is able to transmit N multiplexed ACK/NACKs (e.g., a bit sequence) using N selected ACK/NACK units. The data unit group is defined to explain a bundle of data units for convenience and may not be explicitly defined in the process for describing transmitting/receiving end operations. The number (M) of data units included in a data unit group can be independently determined for each data unit group. In this case, the number M is an integer equal to or greater than 1 and can be determined equal to or independent from each data unit group. If the M is set to 1, ACK/NACK multiplexing is not applied to the corresponding data unit group.

A user equipment is able to select one of a plurality of ACK/NACK units linked to a data unit received for each data unit group or a control signal accompanied by a received data unit according to a plurality of ACK/NACK results. For instance, assuming that maximum 2 data units exist within a data unit group, it is able to select an ACK/NACK unit according to the method exemplarily shown in Table 1. In case that the number of data units included within a data unit group is equal to or greater than 3, it is able to select an ACK/NACK unit using a similar method.

Figure 9:
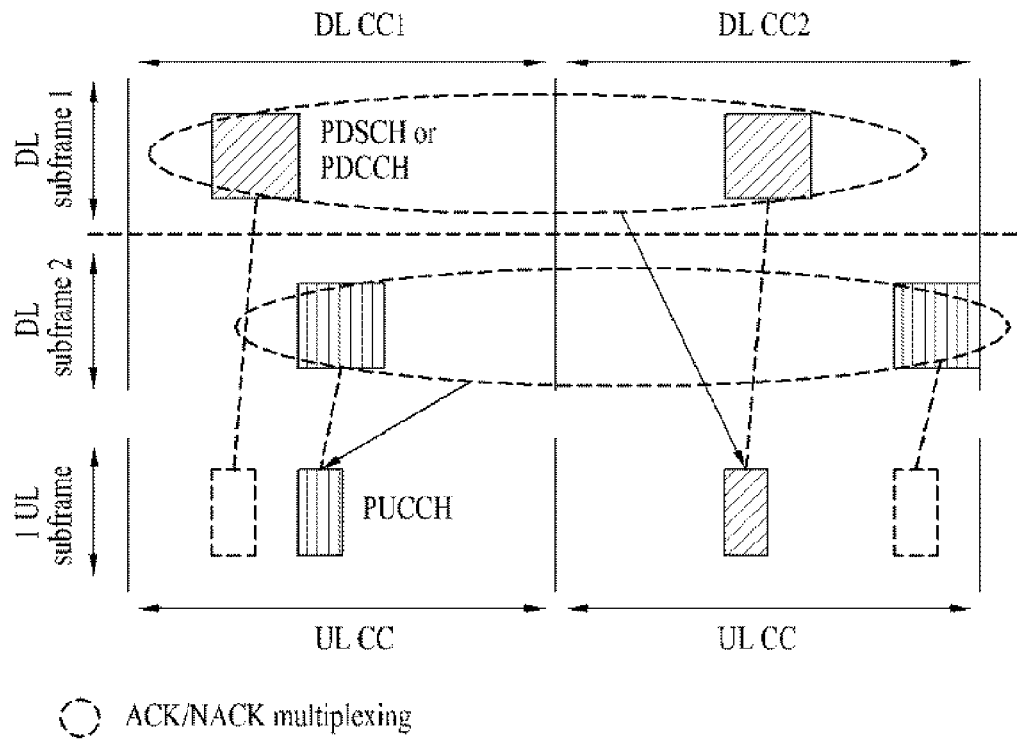
FIG. 9 is an exemplary diagram of ACK/NACK transmission according to another embodiment of the present invention.

FIG. 9 is an exemplary diagram of ACK/NACK transmission according to a second embodiment of the present invention. In case of TDD system supporting DL CC aggregation, a base station is able to transmit a plurality of PDSCHs to a user equipment via a plurality of DL CCs and a plurality of DL subframes. The user equipment has to transmit a plurality of ACK/NACKs via PUCCH or PUSCH within a single UL subframe. FIG. 9 shows an example of transmitting ACK/NACK signal via single UL subframe in case of receiving PDSCH via 2 DL subframes and 2 DL CCs. The example shown in FIG. 9 identically applies to an FDD system supporting DL CC aggregation.

Referring to FIG. 9, 4 PDSCHs are received via 2 DL CCs in 2 DL subframes. In this case, PUCCH resources linked to 4 PDSCHs (or PDCCH configured to schedule PDSCH) are reserved. The resource linkage can be automatically connected for example by using the equation 1 or can be (additionally) designated/limited/modified using signaling information. For another example, although not shown in figure, if one or a plurality of PUCCH resources are allocated in advance in a semi-static manner, a user equipment may use PUCCH resource which is linked per DL CC (group) and/or DL subframe (group). For more detailed information, the description of the first embodiment can be referred. A user equipment then performs ACK/NACK multiplexing over PDSCH(s) on a plurality of DL CCs within each DL subframe. Subsequently, the user equipment transmits the ACK/NACK multiplexed for each DL subframe via a selected PUCCH resource to a base station. In particular, the user equipment is able to transmit a plurality of the multiplexed ACK/NACKs in a signal UL frame to the base station via a plurality of PUCCHs. The PUCCH carrying the multiplexed ACK/NACK relevant to each data unit group can be transmitted via a specific UL CC (e.g., an anchor or primary UL CC) or different UL CCs.

Third Embodiment

ACK/NACK Bundling Per Data Unit Group+ACK/NACK Multiplexing Over a Plurality of Data Unit Groups According to a third embodiment, a plurality of (potential) data units are divided into N groups (where N≥1). A plurality of the data units can be grouped per time interval (e.g., at least one subframe), frequency interval (e.g., at least one DL CC) or time/frequency interval. A plurality of ACK/NACK results for data units belonging to each of the groups are converted to one bundled ACK/NACK result (e.g., 1-bit information) by ACK/NACK bundling. Subsequently, a user equipment applies ACK/NACK multiplexing over bundled ACK/NACK results (bits). The multiplexed ACK/NACK can be transmitted via one ACK/NACK unit selected from a plurality of reserved ACK/NACK units (e.g., N reserved ACK/NACK units).

In particular, if there are M*N (potential) data units, the user equipment generates ACK/NACK bit bundled for M data units within each data unit group. Subsequently, by applying the ACK/NACK multiplexing over the N bundled ACK/NACK bits, ACK/NACK signal can be transmitted via one ACK/NACK unit selected from N reserved ACK/NACK units. The number (M) of data units included in a data unit group can be independently determined for each data unit group. In this case, the number M is an integer equal to or greater than 1 and can be determined equal to or independent from each data unit group. If the M is set to 1, ACK/NACK bundling is not applied to the corresponding data unit group. According to the present embodiment, it is able to decrease the number ACK/NACK units a user equipment should transmit simultaneously. And, the bundled ACK/NACK information corresponding to each data unit group can be provided to a base station. Moreover, in order to support a case that the number of ACK/NACK bundling bits to be multiplexed is incremented, it is possible to select at least two ACK/NACK units in a procedure of ACK/NACK multiplexing after ACK/NACK bundling.

Figure 10:
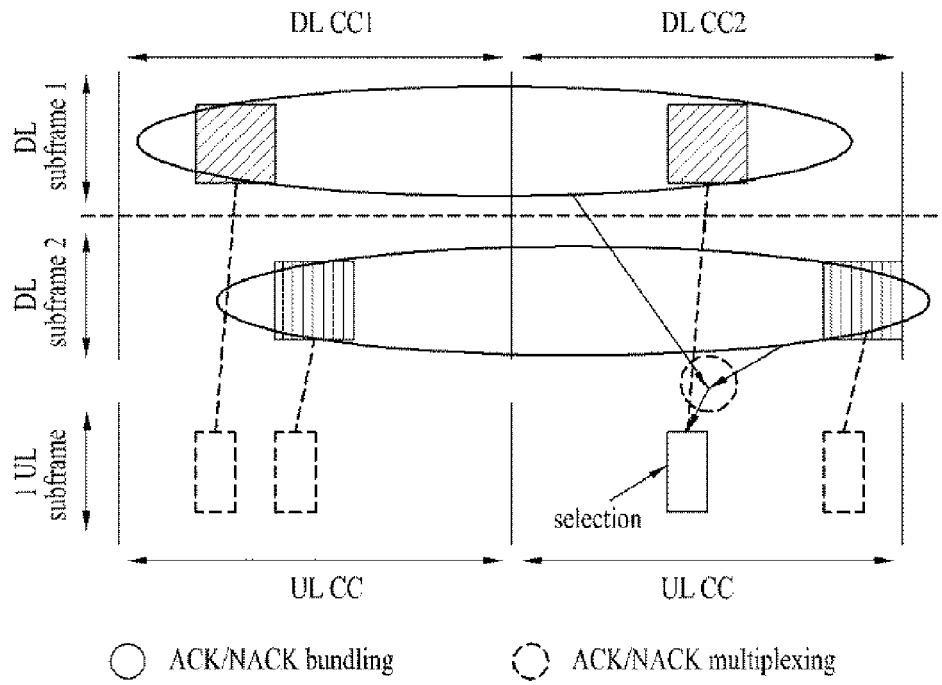
FIG. 10 and FIG. 11 are exemplary diagrams of ACK/NACK transmission according to another embodiment of the present invention.
Figure 11:
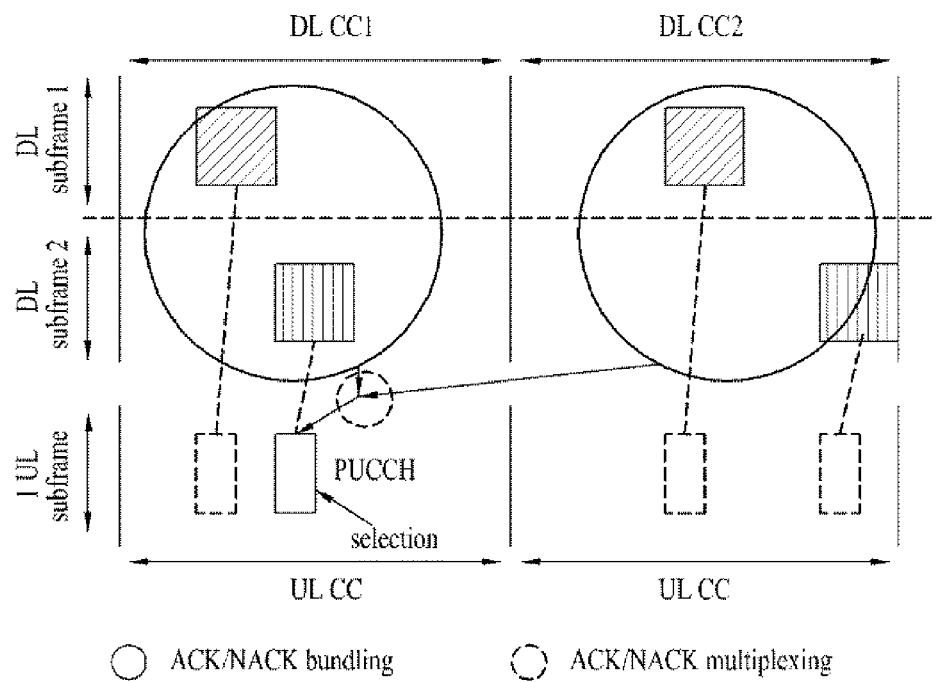

FIG. 10 and FIG. 11 are exemplary diagrams of ACK/NACK transmission according to a third embodiment of the present invention. In case of TDD system supporting DL CC aggregation, a base station is able to transmit a plurality of PDSCHs to a user equipment via a plurality of DL CCs and a plurality of DL subframes. In this case, the user equipment may have to transmit a plurality of ACK/NACKs via PUCCH or PUSCH within a single UL subframe. The drawing shows an example of transmitting ACK/NACK signal via single UL subframe in case of receiving PDSCH via 2 DL subframes and 2 DL CCs.

In particular, FIG. 10 shows an example for a method of performing ACK/NACK multiplexing in time interval after performing ACK/NACK bundling in frequency interval. On the contrary, FIG. 11 shows an example for a method of performing ACK/NACK multiplexing in frequency interval after performing ACK/NACK bundling in time interval. Referring to FIG. 10, a user equipment generates ACK/NACK bundled for 2 PDSCHs received via each DL subframe and is then able to transmit ACK/NACK multiplexed for 2 DL subframes using PUCCH resource selected based on ACK/NACK multiplexing. Referring to FIG. 11, a user equipment generates ACK/NACK bundled for 2 PDSCHs received via each DL CC and is then able to transmit ACK/NACK multiplexed for 2 DL CCs using PUCCH resource selected based on ACK/NACK multiplexing.

For clarity and convenience of description, 2 UL CCs occupying PUCCH resources are illustrated to correspond to DL CC1 and DL CC2, respectively. Yet, the 2 UL CCs can indicate the same UL CC (e.g., anchor or primary UL CC) or different UL CCs. Moreover, in case of receiving 4 PDSCHs, the drawing shows that 4 PUCCH resources linked to PDSCH (or PDCCH configured to schedule PDSCH) are reserved. Yet, a single PUCCH resource may be reserved per ACK/NACK bundling execution unit. For instance, in the example shown in FIG. 10, the user equipment is able to transmit the multiplexed ACK/NACK using one PUCCH selected from the PUCCHs linked to a specific PDSCH or PDCCH (e.g., a first or last PDSCH) in each DL subframe. In this case, the position/order of the PDSCH or PDCCH can be determined using a DL CC index and a CCE index. Similarly, in the example shown in FIG. 11, the user equipment is able to transmit the multiplexed ACK/NACK using one PUCCH selected from the PUCCHs linked to a specific PDSCH or PDCCH (e.g., a first or last PDSCH) in each DL CC. In this case, the position/order of the PDSCH or PDCCH can be determined using a subframe index. If a last PDSCH or PDCCH is linked to a PUCCH resource in time and/or frequency interval, error due to no data reception can be easily handled. For another example, although not shown in figure, if one or a plurality of PUCCH resources are allocated in advance in a semi-static manner, a user equipment may use PUCCH resource which is linked per DL CC (group) and/or DL subframe (group). For more detailed information, the description of the first embodiment can be referred.

Fourth Embodiment

ACK/NACK Transmission Per DL CC Group

In case that N DL CCs are allocated to a user equipment, the user equipment divides the N DL CCs into L DL CC groups and is then able to apply one of the methods exemplarily proposed in the first to third embodiments to each of the DL CC groups. The DL CC group is defined to explain a bundle of DL CCs for convenience and may not be explicitly defined in the process for describing transmitting/receiving end operations. The DL CC group includes at least one DL CC. And, the number of the DL CCs included in each DL CC group can be independently determined.

Figure 12:
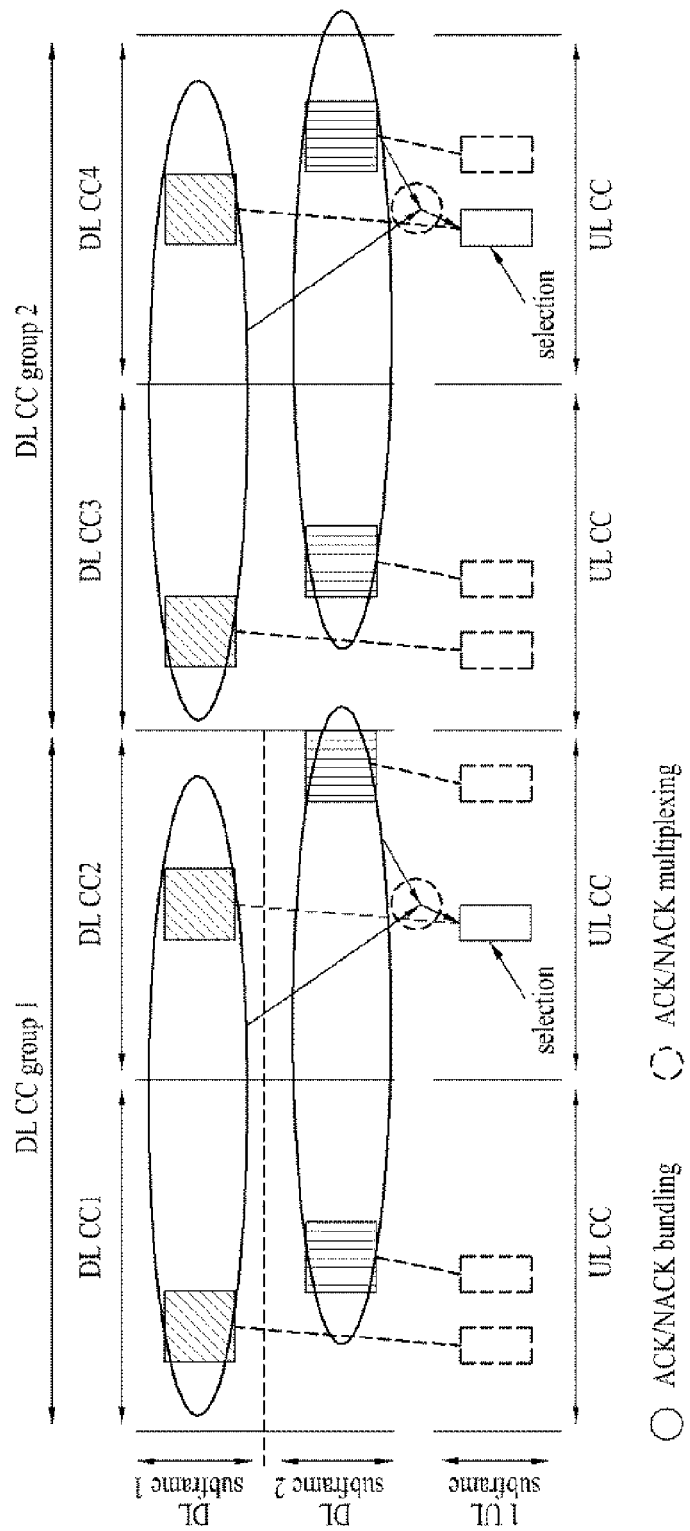
FIGS. 12 to 15 are exemplary diagrams of ACK/NACK transmission according to a further embodiment of the present invention.
Figure 13:
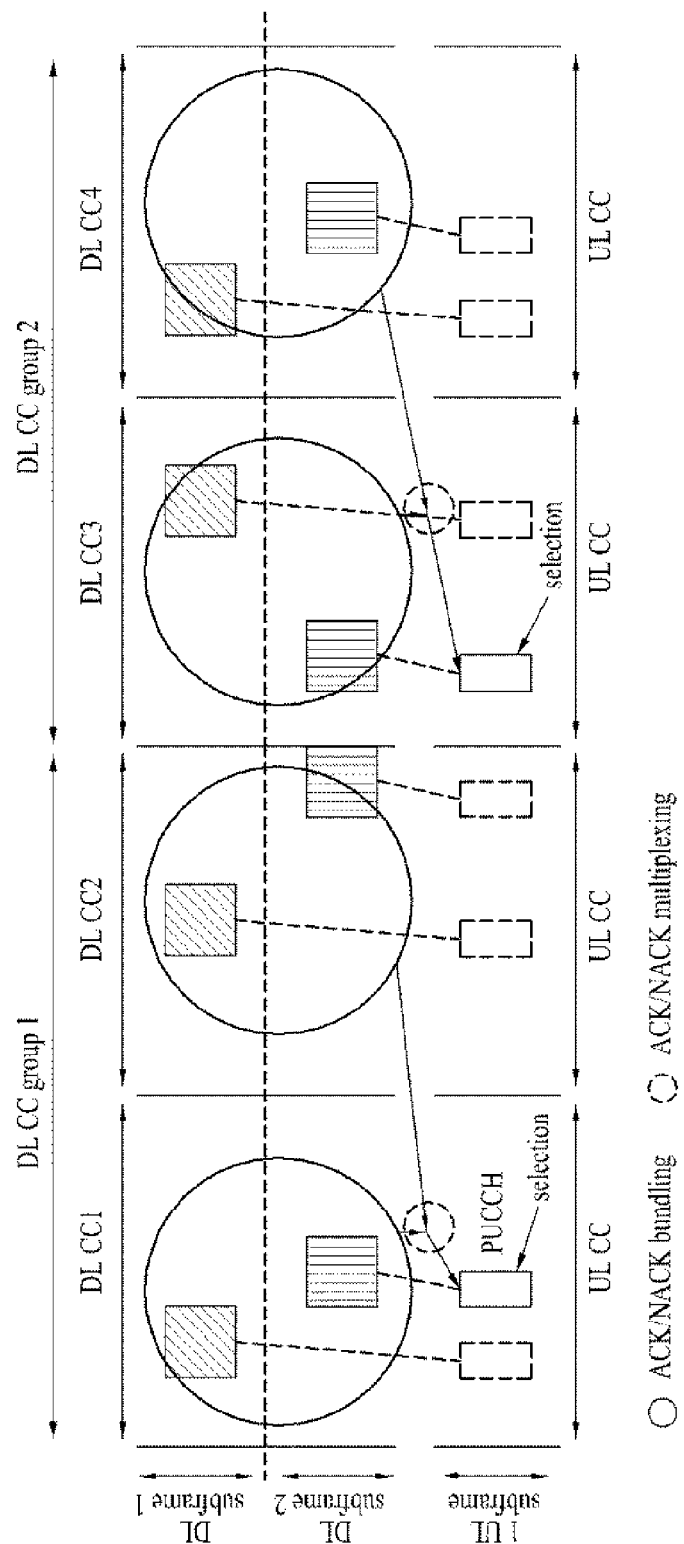
Figure 14:
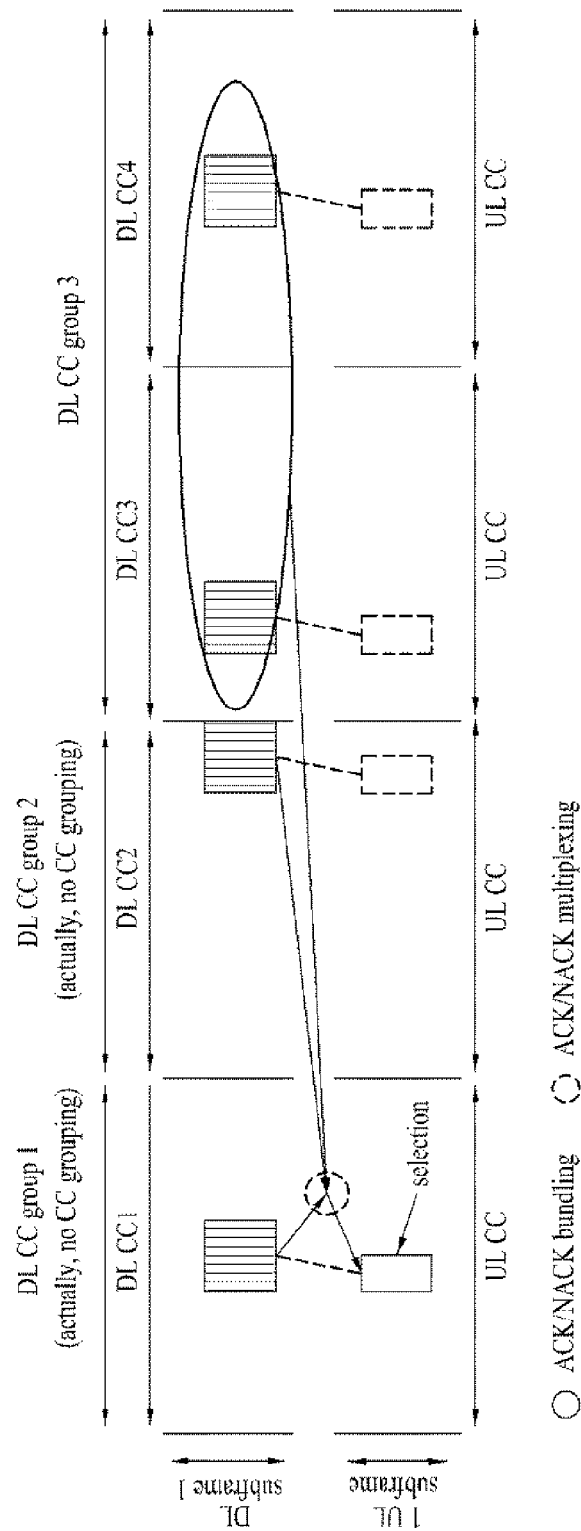
Figure 15:
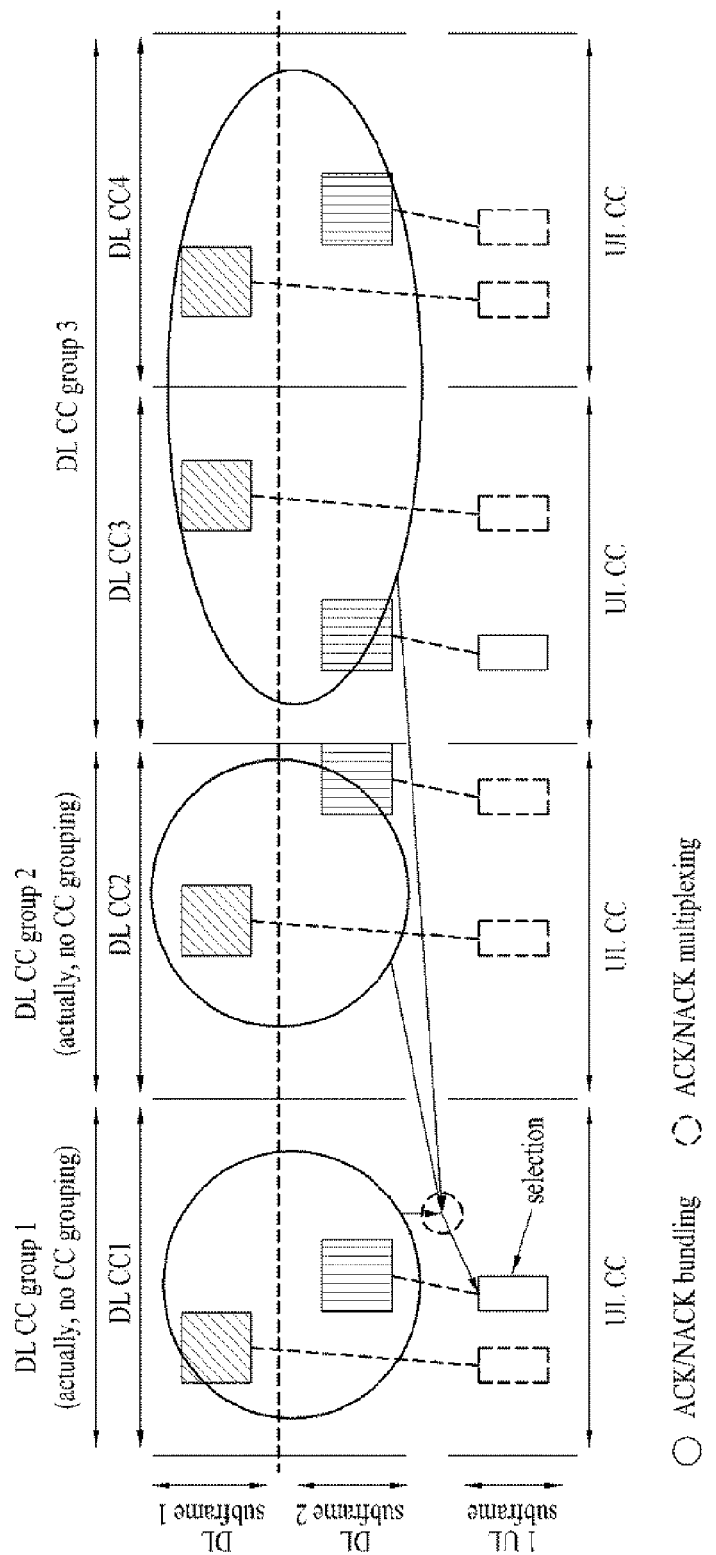

FIG. 12 and FIG. 13 are diagrams for extending the situations shown in FIG. 10 and FIG. 11 to the case of applying to DL CC groups, and their details shall refer to the descriptions of FIG. 10 and FIG. 11, respectively. FIG. 14 and FIG. 15 show the case that the number of DL CCs included in each DL CC group is independent from each other. FIG. 14 corresponds to the case of FDD, and FIG. 15 corresponds to the case of TDD. Referring to FIG. 14, although 4 DL CCs are divided into DL CC groups 1 to 3, since each of the DL CC group 1 and the DL CC group 2 includes a single DL CC only, each of the DL CC group 1 and the DL CC group 2 may not a group actually. Therefore, ACK/NACK bundling is applied to the DL CC3 and the DL CC4 only. Namely, the ACK/NACK bundling is not applied to the DL CC1 and the DL CC2. Afterwards, it is able to transmit ACK/NACK multiplexed for a single DL subframe using PUCCH resource selected based on ACK/NACK multiplexing. Referring to FIG. 15, a user equipment performs ACK/NACK bundling for each DL CC group. Afterwards, it is able to transmit ACK/NACK multiplexed for 2 DL subframes using PUCCH resource selected based on ACK/NACK multiplexing.

For clarity and convenience of description, although 4 UL CCs are illustrated to correspond to DL CC1 to DL CC4, respectively, they can represent the same UL CC (e.g., anchor or primary UL CC) for each DL CC group or different UL CCs.

Fifth Embodiment

ACK/NACK Transmission Per Slot

As mentioned in the foregoing descriptions of the first to fourth embodiments, in order to decrement the number of PUCCHs for ACK/NACK transmission, it is able to apply ACK/NACK bundling or ACK/NACK multiplexing. Yet, if the number of DL CCs and/or DL subframes associated with UL subframe carrying ACK/NACK is high, it may be inappropriate for a user equipment to perform a single PUCCH transmission only. Therefore, it may be able to consider that ACK/NACK is transmitted using a plurality of PUCCH resources. However, transmission of a plurality of PUCCHs in a single subframe requires a considerable amount of transmission power and raises PAPR (peak-to-average power ratio) of UL transmission. In this case, the inefficient use of a transmission power amplifier may reduce the coverage of a user equipment. Therefore, in order to avoid transmitting a plurality of PUCCHs simultaneously, it is able to consider that PUCCH transmission is performed in a slot unit within a subframe.

Figure 16:
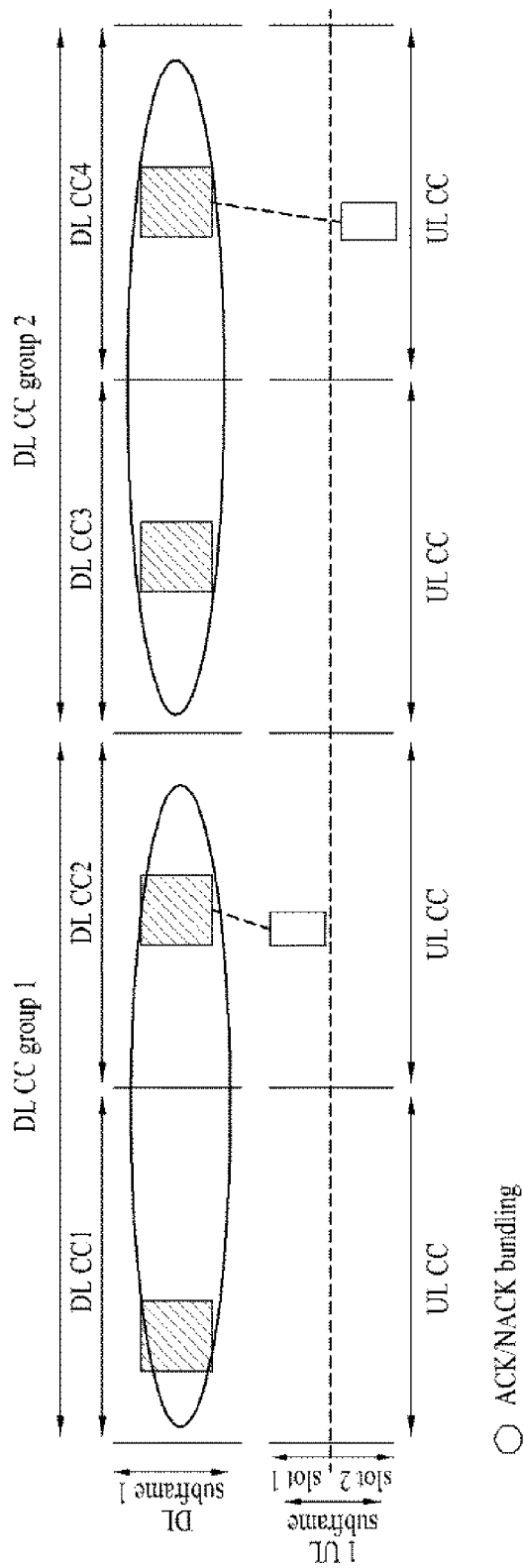
FIGS. 16 to 21 are exemplary diagrams of ACK/NACK transmission according to another further embodiment of the present invention.
Figure 17:
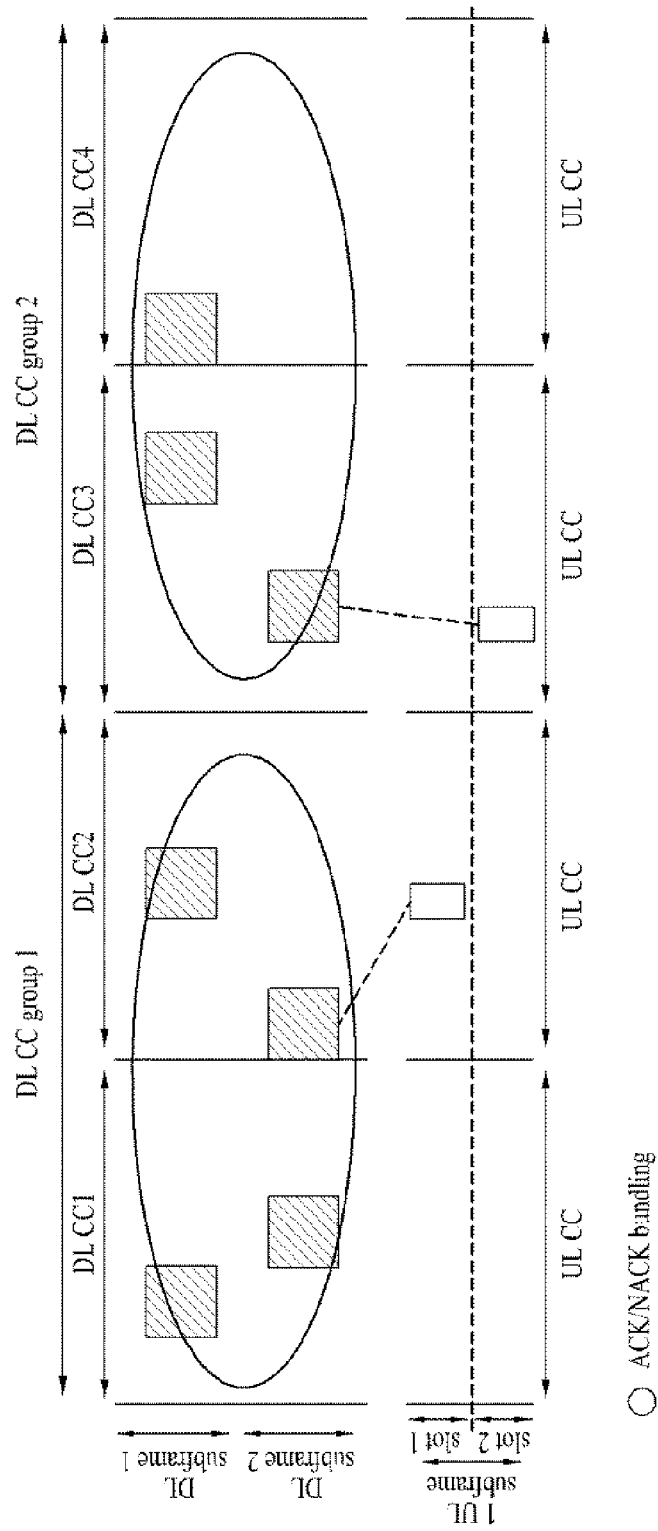

FIG. 16 and FIG. 17 show examples of transmitting ACK/NACK according to a fifth embodiment of the present invention. FIG. 16 corresponds to a case of FDD, and FIG. 17 corresponds to a case of TDD. Referring to FIG. 16, a plurality of DL CCs are divided into N DL CC groups and ACK/NACK bundling is then applied to each of the DL CC groups. Thereafter, N ACK/NACK units are transmitted via N UL slots within a single subframe. In this case, a single ACK/NACK unit is transmitted via a single slot. Referring to FIG. 17, in case of TDD having a plurality of DL CCs aggregated therein, a plurality of DL CCs are divided into N DL CC groups on a plurality of DL subframes and ACK/NACK bundling is applied to each of the DL CC groups on a plurality of the DL subframes. And, the same processes of the former case proceed.

Figure 18:
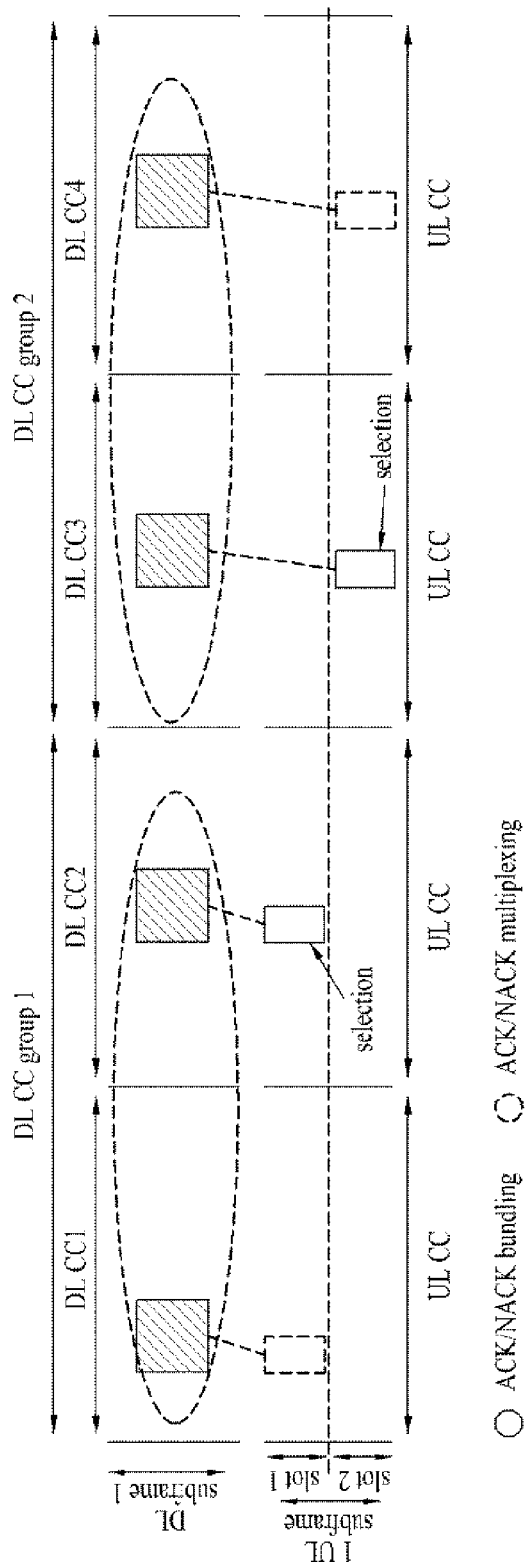
Figure 19:
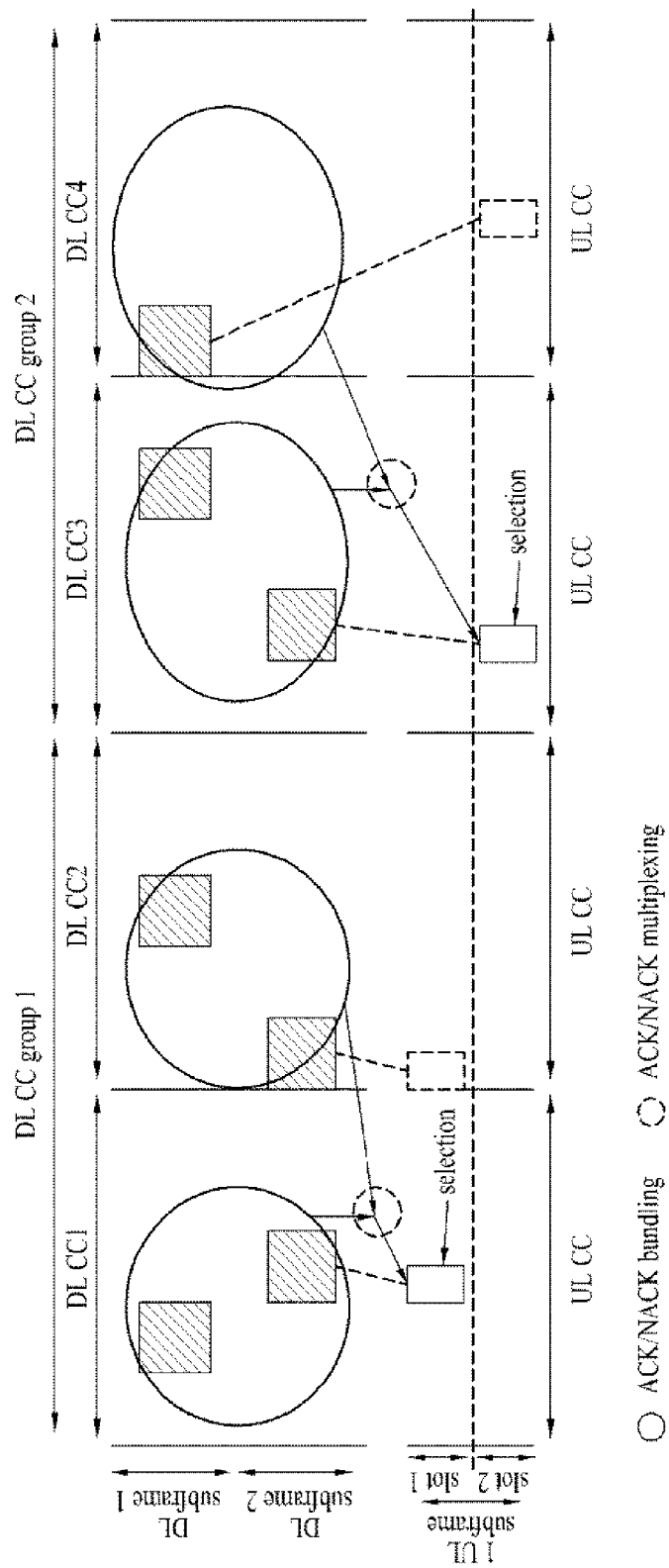

FIG. 18 and FIG. 19 show other examples of transmitting ACK/NACK according to a fifth embodiment of the present invention. FIG. 18 corresponds to a case of FDD, and FIG. 19 corresponds to a case of TDD. Referring to FIG. 18, a plurality of DL CCs are divided into N DL CC groups and ACK/NACK multiplexing is then applied to each of the DL CC groups. Thereafter, N ACK/NACK units, which are selected based on the ACK/NACK multiplexing per DL CC group, are transmitted via N UL slots within a single subframe. Referring to FIG. 19, in case of TDD having a plurality of DL CCs aggregated therein, a plurality of DL CCs are divided into N DL CC groups on a plurality of DL subframes and ACK/NACK bundling is then applied to each of the DL CC groups on a plurality of the DL subframes. Afterwards, ACK/NACK multiplexing is applied to each of the DL CC groups. And, the same processes of the former case proceed.

Figure 20:
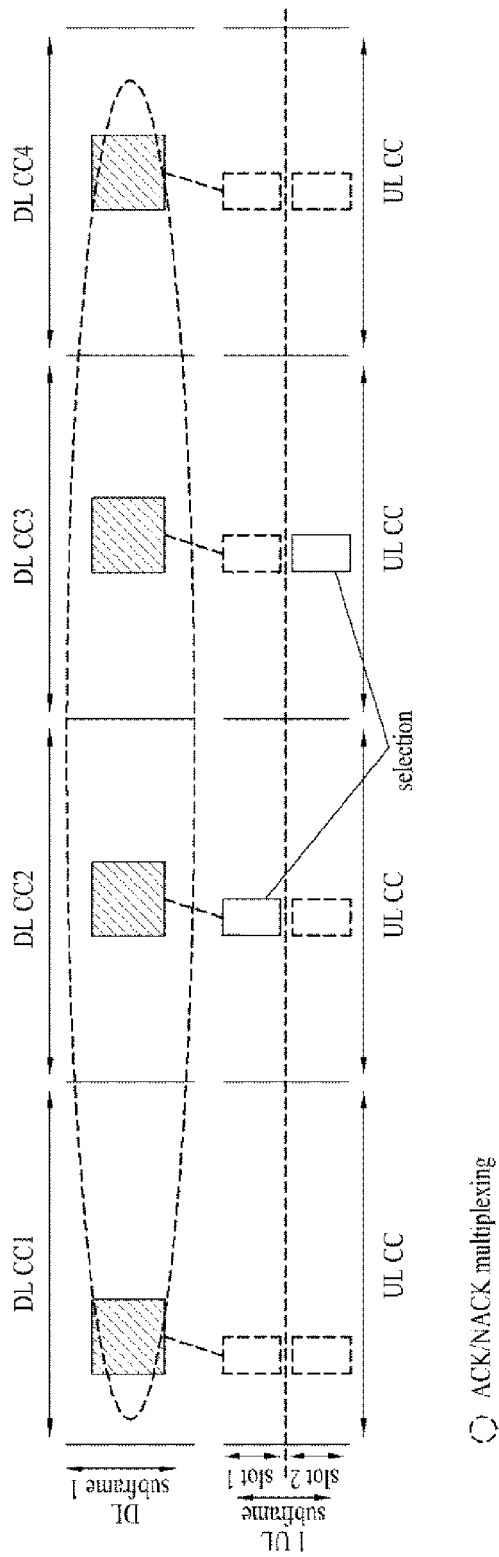
Figure 21:
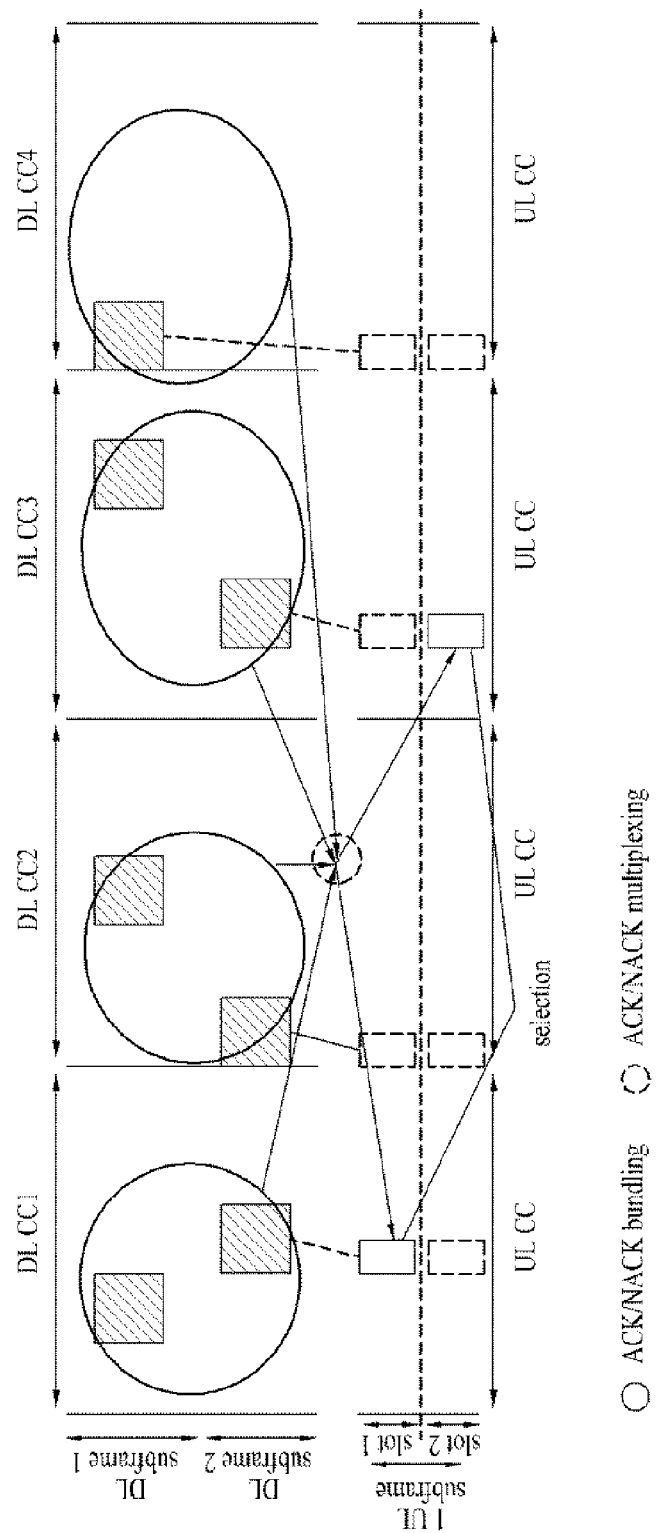

FIG. 20 and FIG. 21 show other examples of transmitting ACK/NACK according to a fifth embodiment of the present invention. FIG. 20 corresponds to a case of FDD, and FIG. 21 corresponds to a case of TDD. Referring to FIG. 20, ACK/NACK multiplexing is applied over a plurality of DL CCs. Yet, in order to support a number of ACK/NACK hypothesis due to a number of DL CCs, simultaneous selection/transmission of N ACK/NACK PUCCHs can be included in ACK/NACK multiplexing algorithm. In particular, using a combination of PUCCH resources selected per slot, it is able to support a more number of ACK/NACK hypothesis. For instance, assuming that there are N slots and that M PUCCH resources are reserved for each slot, it is able to support $_MC_1^N$ ACK/NACK hypothesis using the combination of the PUCCH resources selected per slot. Afterwards, in order to transmit a single ACK/NACK unit to be transmitted via a single slot, N ACK/NACK units are transmitted via N UL slots within a single subframe. Like the example shown in FIG. 21, in case of the TDD having a plurality of the DL CCs aggregated therein, ACK/NACK bundling is applied to a plurality of DL subframes on each of the DL CCs and ACK/NACK bundling can be then applied to the bundled ACK/NACK.

Figure 22:
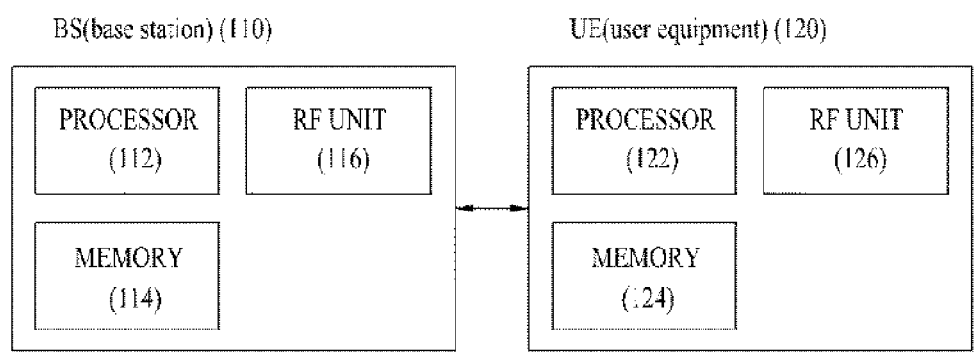
FIG. 22 is an exemplary diagram of a base station and user equipment applicable to an embodiment of the present invention.

FIG. 22 is a diagram illustrating a base station and a user equipment that can be applied to one embodiment of the present invention.

Referring to FIG. 22, the wireless communication system includes a base station (BS) 110 and a user equipment (UE) 120. In the downlink, the transmitter is a part of the base station 110 and the receiver is a part of the user equipment 120. In the uplink, the transmitter is a part of the user equipment 120 and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method and apparatus of ACK/NACK transmission.

The invention claimed is:

1. A method of transmitting an acknowledgement (ACK)/negative acknowledgement (NACK) signal by a user equipment in a wireless communication system, the method comprising:

receiving one or more data units through a first component carrier (CC) group or a second CC group from a base station, each CC group including a plurality of CCs;

bundling one or more ACK/NACK results for the one or more data units per CC to obtain a plurality of bundled ACK/NACK results; and transmitting a two-bit value corresponding to the plurality of bundled ACK/NACK results to the base station using a physical uplink control channel (PUCCH) resource in an uplink subframe including a first slot and a second slot, the PUCCH resource being selected from a plurality of PUCCH resources according to the plurality of bundled ACK/NACK results, wherein if the one or more data units are received through the first CC group, the two-bit value is transmitted only in the first slot of the subframe, and wherein if the one or more data units are received through the second CC group, the two-bit value is transmitted only in the second slot of the subframe.

2. The method of claim 1, wherein the one or more ACK/NACK results for the one or more data units are bundled per at least one subframe.

3. The method of claim 1, wherein the two-bit value is transmitted using a specific uplink CC.

4. A user equipment comprising:
 a radio frequency (RF) unit configured to transceive a radio signal with a base station;
 a memory configured to store information transceived with the base station and parameters required for an operation of the user equipment; and
 a processor connected to the RF unit and the memory, the processor configured to control the RF unit and the memory, wherein the processor is configured to:
  receive one or more data units through a first component carrier (CC) group or a second CC group from the base station, each CC group including a plurality of CCs;
  bundle one or more acknowledgement (ACK)/negative acknowledgement (NACK) results for the one or more data units per CC to obtain a plurality of bundled ACK/NACK results; and transmit a two-bit value corresponding to the plurality of bundled ACK/NACK results to the base station using a physical uplink control channel (PUCCH) resource in an uplink subframe including a first slot and a second slot, the PUCCH resource being selected from a plurality of PUCCH resources according to the plurality of bundled ACK/NACK results, wherein if the one or more data units are received through the first CC group, the two-bit value is transmitted only in the first slot of the subframe, and wherein if the one or more data units are received through the second CC group, the two-bit value is transmitted only in the second slot of the subframe.

5. The user equipment of claim 4, wherein the one or more ACK/NACK results for the one or more data units are bundled per at least one subframe.

6. The user equipment of claim 4, wherein the two-bit value is transmitted using a specific uplink CC.

* * * * *